United States Patent

Shoda

[11] Patent Number: 5,120,033
[45] Date of Patent: Jun. 9, 1992

[54] WORK TABLE FOR WOOD WORKING MACHINE OR THE LIKE

[76] Inventor: Isao Shoda, 116-4, Okaba-cho, Hamamatsu-shi, Shizuoka-ken, Japan

[21] Appl. No.: 720,330

[22] Filed: Jun. 25, 1991

[30] Foreign Application Priority Data

Jul. 3, 1990 [JP] Japan .................. 70937[U]

[51] Int. Cl.⁵ .............................. B25B 11/00
[52] U.S. Cl. ....................................... 269/21
[58] Field of Search .............. 269/20, 21, 309, 310, 269/296, 13, 303, 304; 279/3 R; 294/64 R; 51/235

[56] References Cited

U.S. PATENT DOCUMENTS

| | | | |
|---|---|---|---|
| 4,410,168 | 10/1983 | Gotman | 269/21 |
| 4,640,501 | 2/1987 | Poland | 269/21 |
| 4,684,113 | 8/1987 | Douglas et al. | 269/21 |
| 4,723,766 | 2/1988 | Beeding | 269/21 |
| 4,805,887 | 2/1989 | Ray | 269/21 |

FOREIGN PATENT DOCUMENTS 61-25962 8/1986 Japan .

Primary Examiner—Robert C. Watson
Attorney, Agent, or Firm—Sughrue, Mion, Zinn, Macpeak & Seas

[57] ABSTRACT

A workpiece is placed on a plurality of supporting cylinders which are projected upwardly from an upper plate or a hollow table body. All of the supporting cylinders normally assume a lowered position at which lower end faces thereof contact seat portions in a chamber of the table body so that attracting pads provided at upper ends of the supporting cylinders are disconnected from the chambers. Accordingly, even if the chamber is put into a negative pressure condition, the workpiece is not attracted to the attracting pads. Then, compressed air is supplied to the pneumatic cylinders of those supporting cylinders which fall within a horizontal area of the workpiece to lift those supporting cylinders. Consequently, the lower end faces of those supporting cylinders are spaced away from the seat portions to allow communication between the attracting pads and the chamber by way of air sucking passageways formed in the supporting cylinders to suck air through the attracting pads. As a result, the workpiece is attracted to the attracting pads and thus fixed to the lifted supporting cylinders.

10 Claims, 4 Drawing Sheets

WORK TABLE FOR WOOD WORKING MACHINE OR THE LIKE

BACKGROUND OF THE INVENTION

1. Field of the Invention

This invention relates to a work table for a wood working machine or the like for receiving a work (e.g. a workpiece) thereon and attracting the work thereto by vacuum.

2. Description of the Prior Art

Conventional work tables of the type mentioned are commonly constructed such that a work table is made hollow and a large number of air sucking holes are formed in an upper plate of the work table, and the work table and a blower are interconnected by way of a hose so as to put the inside of the work table into a negative pressure condition so that air may be sucked into the inside of the work table through the air sucking holes to attract a work directly to an upper face of the upper plate of the work table. An exemplary one of such conventional work tables is disclosed, for example, in Japanese Utility Model Publication Application No. 61-25962.

When an end face of a work is to be worked on a wood working machine which includes such a work table as described just above, such an auxiliary table 3 as shown in FIG. 5 is prepared which is smaller than a work table 1 and besides a little smaller than an area of a work 2 and is fixed to an upper plate 4 of the work table 1. The auxiliary table 3 has a large number of air sucking holes 6 formed in an upper plate 5 thereof and is opened at the bottom over the entire area thereof such that it may be acted upon by an air sucking action of a blower not shown by way of the hollow inside of the work table 1 and a large number of air sucking holes formed in the upper plate 4 of the work table 1. Those of the air sucking holes 7 of the work table 1 which are not covered with the auxiliary table 3 are covered with a separately prepared cover plate 8 from above. Thus, the work 2 is placed onto and attracted to the auxiliary table 3, and an end face 2a of the work 2 is worked by a tool 10 of a working head 9 while it is held in a spaced relationship above the upper plate 4 of the work table 1.

Such method, however, is disadvantageous in that it is uneconomical since a plurality of different auxiliary tables having different sizes must be prepared, and besides much labor is required for mounting and removing operations of an auxiliary table because, in working (e.g., tooling) a work having a different size, an auxiliary table must be exchanged each time the size must be changed. Also it is a disadvantage that, since a work must be carried into or out from a higher location by a distance equal to the height of an auxiliary table than the vertical position of the upper face of the work table, corresponding hard labor is required for carrying in and out operations of a work.

SUMMARY OF THE INVENTION

It is an object of the present invention to provide a work table which is suitable for working of an end face of a work and can cope with a work of a different size suitably and rapidly without the necessity of replacement of any part.

It is another object of the present invention to provide a work table to and from which a work can be carried in and out readily.

In order to attain the objects, according to the present invention, there is provided a work table for a wood working machine or the like which comprises a hollow table body having an upper plate and a lower plate and defining a chamber therein between the upper and lower plates, the chamber being capable of being put into a negative pressure condition, a large number of supporting cylinders mounted for individual upward and downward sliding movement in a juxtaposed relationship on the table body in such a manner as to extend upwardly through and from the upper plate of the table body, an attracting pad provided at an upper end of each of the supporting cylinders, each of the supporting cylinders having an air sucking passageway formed therein for communicating the attracting pad with the chamber, the air sucking passageway having a lower end opening at a lower end face of the supporting cylinder, a spring for urging each of the supporting cylinders downwardly to normally contact the lower end face of the supporting cylinder with a seat portion in the chamber to close the lower end opening of the air sucking passageway, a pneumatic cylinder disposed in each of the supporting cylinders for driving the supporting cylinder to move upwardly against the corresponding spring, and a valve device for controlling supplying and discharging of compressed air into and from each of the pneumatic cylinders.

With the work table, since the large number of supporting cylinders are projected upwardly from the upper plate of the table body, a work is supported on the table body by way of those supporting cylinders which fall in a horizontal area of the work. The supporting cylinders all normally assume the lowered position at which the lower end faces thereof contact with the seat portions in the chamber. In this instance, since the lower end openings of the air sucking passageways are closed with the seat portions to disconnect the attracting pads and the chamber from each other, even if the chamber is in a negative pressure condition, a work will not be attracted to the attracting pads. If compressed air is supplied to the pneumatic cylinders for those supporting cylinders which fall in a horizontal area of a work to lift those supporting cylinders, then the lower end faces of the supporting cylinders are spaced away from the corresponding seat portions to allow the corresponding attracting pads to be communicated with the chamber by way of the air sucking passageways to suck air through the attracting pads. Consequently, the work is attracted to the attracting pads and fixed to the lifted supporting cylinders.

Since a work is supported on the supporting cylinders by way of the attracting pads, there is the possibility that, even when no air is being sucked by way of the attracting pads, a lower face of the work may contact closely with the attracting pads so that resistance mat take place against carrying in or carrying out of the work. In order to eliminate or minimize such possible resistance, a large number of carrying in/out pneumatic cylinders capable of lifting, with piston rods thereof, a work higher than a position to which the work can be lifted by the supporting cylinders may be disposed in a juxtaposed relationship among the supporting cylinders. A head having a spherical face may be provided at an upper end of the piston rod of each of the carrying in/out pneumatic cylinders.

The above and other objects, features and advantages of the present invention will become apparent from the following description and the appended claims, taken in

DESCRIPTION OF THE PREFERRED EMBODIMENT

Figure 1:
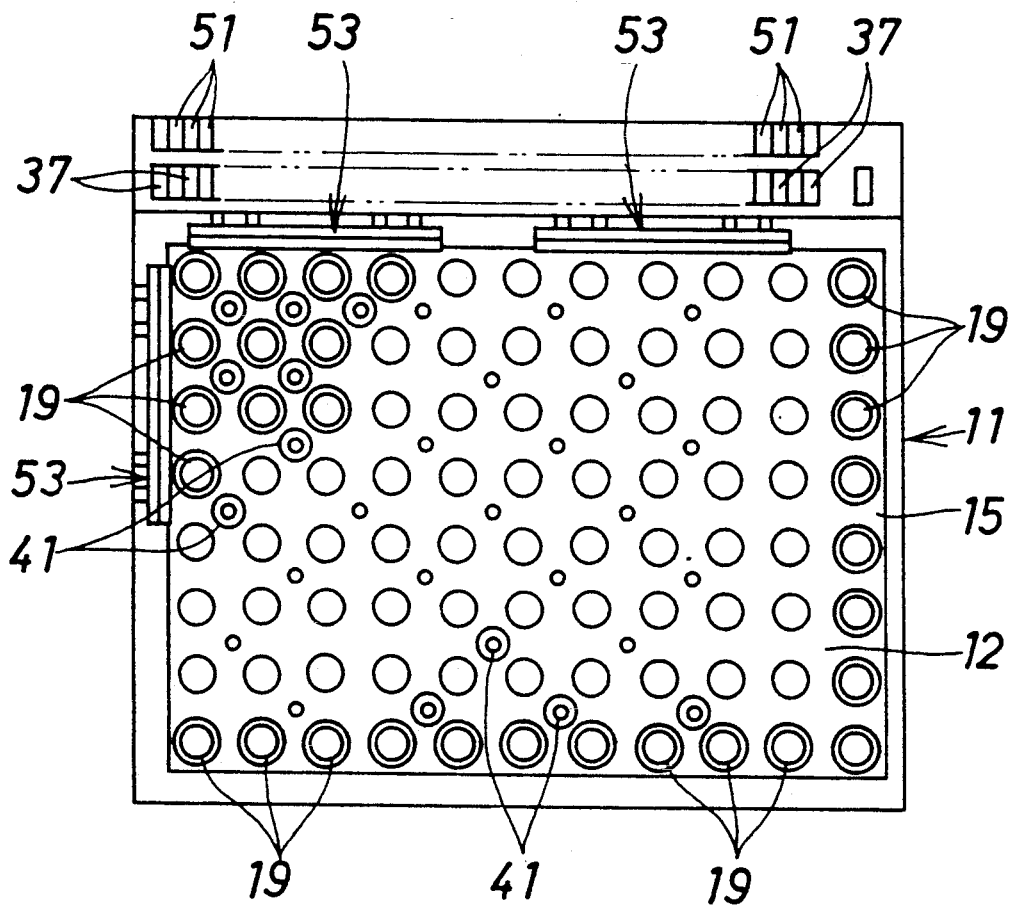
FIG. 1 is a plan view of an entire work table according to the present invention with part thereof shown in a simplified manner.
Figure 2:
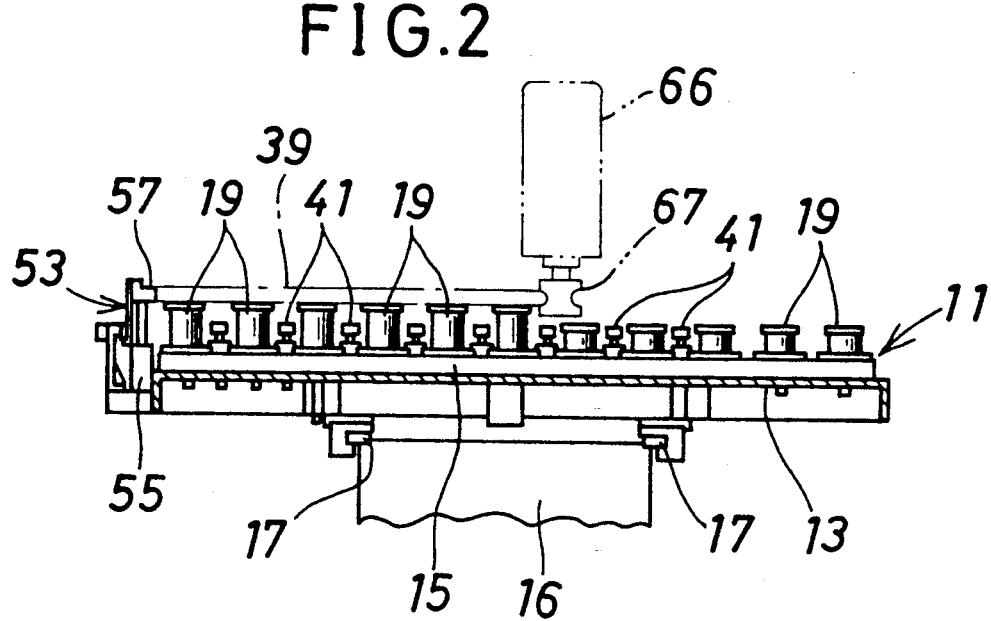
FIG. 2 is a side elevational view of the work table of FIG. 1 with a body thereof partially cut away.
Figure 3:
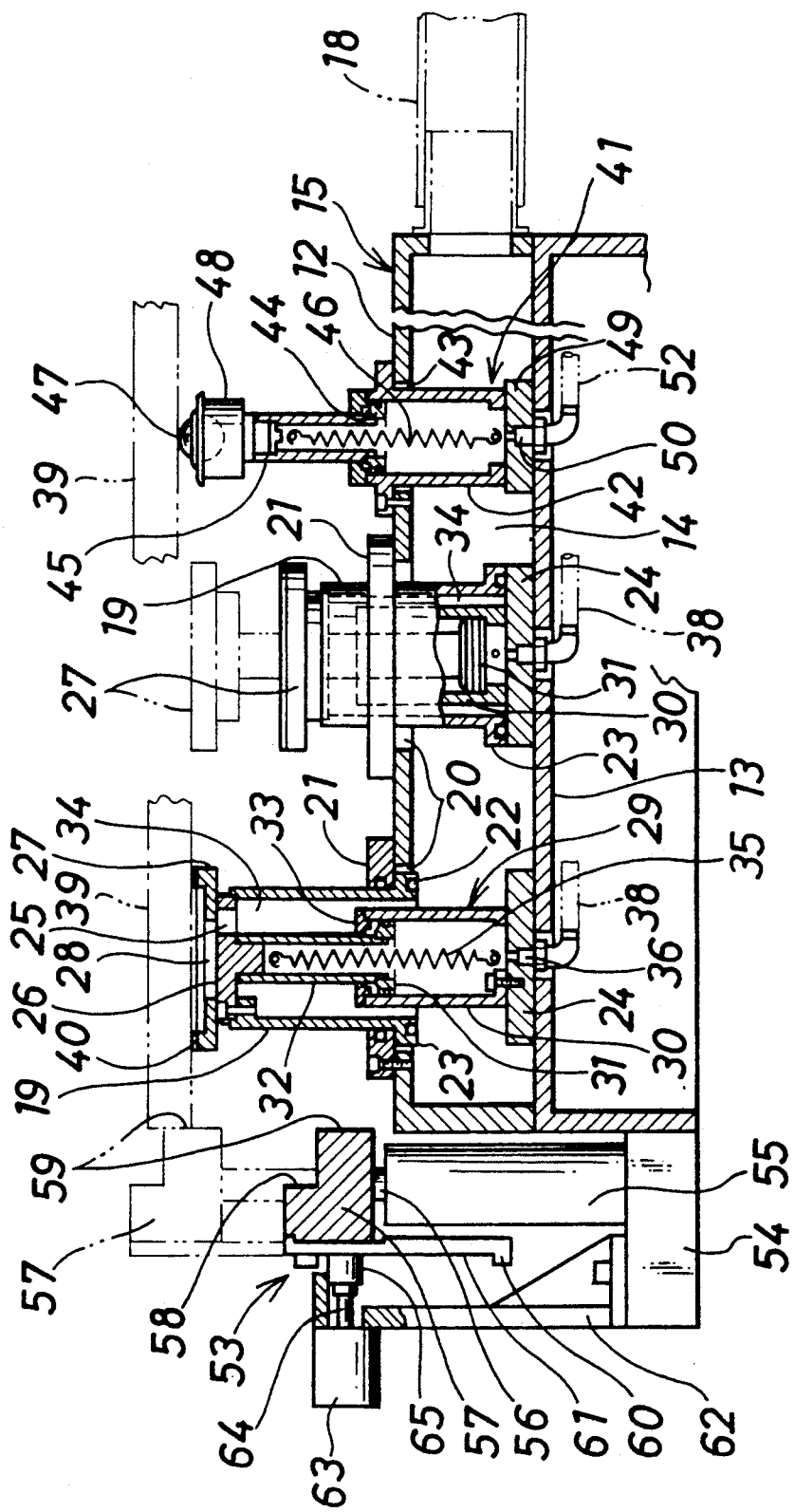
FIG. 3 is an enlarged sectional view of part of the work table of FIG. 1.

Referring first to FIGS. 1 to 3, there is shown a work table to which the present invention is applied. The work table shown is generally denoted at 11 and includes, as particularly shown in FIG. 3, a table body 15 in the form of a hollow parallelepiped having an upper plate 12 and a lower plate 13 and defining a flattened chamber 14 therein between the upper and lower plates 12 and 13. The table body 15 is supported for forward and backward sliding movement in a direction perpendicular to the plane of FIG. 2 along a pair of left and right rails 17 on a bed 16. The chamber 14 is connected to a blower not shown by way of a hose 18, a valve not shown and so forth so that the inside thereof may be put into a vacuum or negative pressure condition by sucking air therefrom.

A large number of supporting cylinders 19 are mounted vertically in a juxtaposed, suitably spaced relationship by predetermined distances in the forward and backward direction and also in the leftward and rightward direction on the upper plate 12 of the table body 15 for upward and downward sliding movement such that they may be projected upwardly through and from a large number of holes 20 formed in the upper plate 12. A guide ring 21 is securely mounted around each of the holes 20 on an upper face of the upper plate 12 for guiding the corresponding supporting cylinder 19 upon upward or downward sliding movement.

A flange 23 is integrally formed at a lower end of each of the supporting cylinders 19 and has a packing 22 mounted thereon. The flanges 23 are positioned for contacting with corresponding seat plates 24 securely mounted on the lower plat 13. A cover 26 is securely mounted at an upper end of each of the supporting cylinders 19 and has a hole 25 formed therein, and an attracting pad 27 is securely mounted on the cover 26. The attracting pad 27 has an air sucking hole 28 formed at the center thereof in communication with the hole 25 of the cover 26.

In order for each of the supporting cylinders 19 to be moved upwardly and downwardly, it has a pneumatic cylinder 29 disposed vertically therein in the following manner. In particular, each of the pneumatic cylinders 29 includes a cylinder tube 30 having a smaller diameter than the corresponding supporting cylinder 19 and securely mounted on the corresponding seat plate 24 such that a lower end opening thereof may be closed with the seat plate 24. A piston rod 32 in the form of a pipe is provided on the piston 31 and extends upwardly through and from a cover 33 at an upper end of the cylinder tube 30. The piston rod 32 is secured at the top end thereof to the cover 26 at the top of the supporting cylinder 19. Since the supporting cylinder 19 accommodates the cylinder tube 30 in the inside thereof with a gap left therebetween, a gap spacing 34 is formed between the supporting cylinder 19 and the cylinder tube 30 and piston rod 32 and communicates with the hole 25 and the air sucking hole 28. A return spring 35 extends between the piston rod 32 and the cylinder tube 30 to urge the piston rod 32 downwardly. A connecting port 36 is formed at the center of the seat plate 24 of the cylinder tube 30 and is connected by way of an air pipe 38 to a corresponding one of a large number of solenoid valves 37 which are disposed in a row on an outer edge portion of one side of the table body 15.

Since each of the supporting cylinders 19 is coupled to the respective piston rod 32 in the inside thereof by way of the cover 26 as described above, those of the supporting cylinders 19 for which no compressed air has been fed into the cylinder tubes 30 are each moved down together with the piston rod 32 by the return spring 35 until the flange 23 thereof is contacted with the corresponding seat plate 24 to disconnect the gap spacing 34 and the chamber 14 from each other. Accordingly, each of such cylinders 19 does not perform any attracting operation with the attracting pad 27 thereof.

On the contrary, in each of those of the supporting cylinders 19 for which compressed air has been fed into the cylinder tubes 30, the piston 31 is driven upwardly so that it is moved upwardly together with the piston rod 32 to a predetermined vertical position at which the flange 23 is contacted with the guide ring 21. Consequently, the gap spacing 34 is communicated with the chamber 14 so that an attracting operation by the attracting pad 27 is performed.

Accordingly, if a work 39 is placed on the supporting cylinders 19 and then the first solenoid valves 37 are opened only for those of the supporting cylinders 19 which fall in a horizontal area of the work 39 to cause compressed air to be fed into the corresponding cylinder tubes 30, then the work 39 is attracted to the attracting pads 27 of those supporting cylinders 19. In order to assure a good attracting performance, an annular rubber packing 40 is mounted on an upper face of each of the attracting pads 27.

In order to facilitate carrying in and out of a work, a large number of carrying in/out pneumatic cylinders 41 are mounted in the following manner in a juxtaposed relationship among the supporting cylinders 15 on the table body 19. In particular, each of the pneumatic cylinders 41 includes a cylinder tube 42 mounted vertically on the upper plate 12 of the table body 15 such that it partially extends upwardly through and from a hole 43 formed in the upper plate 12. A piston 44 is fitted for sliding movement in the cylinder tube 42 and has a hollow piston rod 45 provided thereon such that it extends upwardly through and from the upper plate 12. A return spring 46 extends between the piston rod 45 and the cylinder tube 42. A head 48 is securely mounted at an upper end of the piston rod 45 and has a ball 47 mounted for rotation thereon. A connecting port 50 is formed at the center of a lower end cover 49 of each of the cylinder tubes 42 and connected by way of an air pipe 52 to a corresponding one of a large number of second solenoid valves 51 which are provided in a row on an outer edge portion of the same side of the table body 15.

Each of the pneumatic cylinders 41 operates in such a manner that, when the corresponding solenoid valve 51 is opened so that compressed air is fed into the cylinder tube 42, the piston 44 and the piston rod 45 thereof are moved upwardly to their upper side stroke end against the return spring 46. Such upper side stroke end is determined such that the ball 47 is positioned a little higher than the attracting pads 27 of the supporting cylinders 19 which are raised to the predetermined vertical position as described hereinabove.

One or a plurality of scale devices 53 are mounted on each of two adjacent side edges of the table body 15 for positioning a work 39 in a horizontal direction. Each of the scale devices 53 includes a plurality of scale height changing over pneumatic cylinders 55 mounted vertically on a base 54 which is mounted on a side edge of the table body 15, and a horizontally elongated scale 57 is securely mounted at the top ends of piston rods 56 of the pneumatic cylinders 55. The scale 57 has a pair of upper and lower offset positioning faces 58 and 59 formed on an inner side face thereof while a stopper 61 having a protruded portion 60 thereon is securely mounted on an outer side face of the scale 57. Meanwhile, a stopper pneumatic cylinder 63 is mounted horizontally on a bracket 62 which is in turn mounted vertically on the base 54. A head 65 is provided at an end of a piston rod 64 of the pneumatic cylinder 63 for engaging the protruded portion 60 of the stopper 61.

Accordingly, if the piston rod 56 of the scale height changing over pneumatic cylinder 55 is expanded while the piston rod 64 of the stopper pneumatic cylinder 63 is in a contracted condition, then since the protruded portion 60 of the stopper 61 does not collide with the head 65, the piston rod 56 is expanded to and stopped at its stroke end. In this instance, the scale 57 assumes such a vertical position as indicated by chain lines in FIG. 3 so that an end face of a work 39 on the upwardly moved supporting cylinders 19 is contacted with the lower positioning face 59 thereof. On the other hand, in case the piston rod 64 of the stopper pneumatic cylinder 63 is expanded and then the piston rod 56 of the scale height changing over pneumatic cylinder 55 is expanded, such expansion of the piston rod 56 is stopped at a position at which the protruded portion 60 of the stopper 61 is contacted with and stopped by the head 65. The vertical position of the scale 57 then is a little lower than the position indicated by chain lines in FIG. 3 so that an end face of a work 39 on the upwardly moved supporting cylinders 19 will be contacted with the upper side positioning face 58 thereof. Accordingly, the work table 11 can cope with a variation in size of a work 39.

Subsequently, description will be given of a manner of use of the work table 11.

The first and second solenoid valves 37 and 51 normally remain in a deenergized condition and hence in a closed condition while the supporting cylinders 19 normally assume a moved down position under the urging forces of the respective return springs 35 and accordingly the gap spacings 34 and the chamber 14 are held in a mutually disconnected condition. Also the piston rods 45 of the carrying in/out pneumatic cylinders 41 assume a moved down position under the urging forces of the respective return springs 46.

In this condition, if all of the second solenoid valves 51 are energized into an open condition, then compressed air is fed into all of the carrying in/out pneumatic cylinders 41 to move the piston rods 46 of the pneumatic cylinders 41 upwardly to the respective upper side stroke ends. Further, the scale height changing over pneumatic cylinders 55 of the scale devices 53 are rendered operative to lift the respective scales 53 to such a position as indicated by chain lines in FIG. 3 or to a position a little lower than such position as described hereinabove.

Subsequently, the first solenoid valves 37 corresponding to only those of the supporting cylinders 19 which are required to support a work 39 thereon will be energized into an open condition. Consequently, compressed air is fed into the corresponding cylinder tubes 30 so that the corresponding supporting cylinders 19 are pushed up by the piston rods 32 to establish communication between the gap spacing 34 and the chamber 14.

After such condition is reached, a work 39 will be carried onto the work table 11. Thereupon, the work 39 will be placed on the lifted piston rods 34 of the carrying in/out pneumatic cylinders 41. In this instance, since the balls 47 are mounted for rotation at the top ends of the piston rods 45, the work 39 can be smoothly moved horizontally until an end face thereof is contacted with the positioning face 58 or 59 of the scale 57.

Subsequently, all of the second solenoid valves 51 are closed to allow the piston rods 45 of all of the carrying in/out pneumatic cylinders 41 to be moved down by the return springs 46 while the valve connected to the blower is opened to put the inside of the chamber 14 into a negative pressure condition. Consequently, the work 39 is placed on the lifted supporting cylinders 19 and attracted to the attracting pads 27. After then, the scales 57 are moved down, and then a working head 66 is rendered operative to work the end face of the work 39 with a tool 67 thereon.

After completion of such working of the work 39, the valve connected to the blower is closed, and then all of the second solenoid valves 51 are opened. Consequently, the work 39 is released from the attraction by the attracting pads 27 and is then removed from the attracting pads 27 and then the piston rods 45 are lifted by the carrying in/out pneumatic cylinders 41 until the work 39 is received on and moved upwardly by the balls 47 at the upper ends of the piston rods 45. Accordingly, the work 38 after completion of working can be smoothly moved horizontally and carried out readily.

Figure 4:
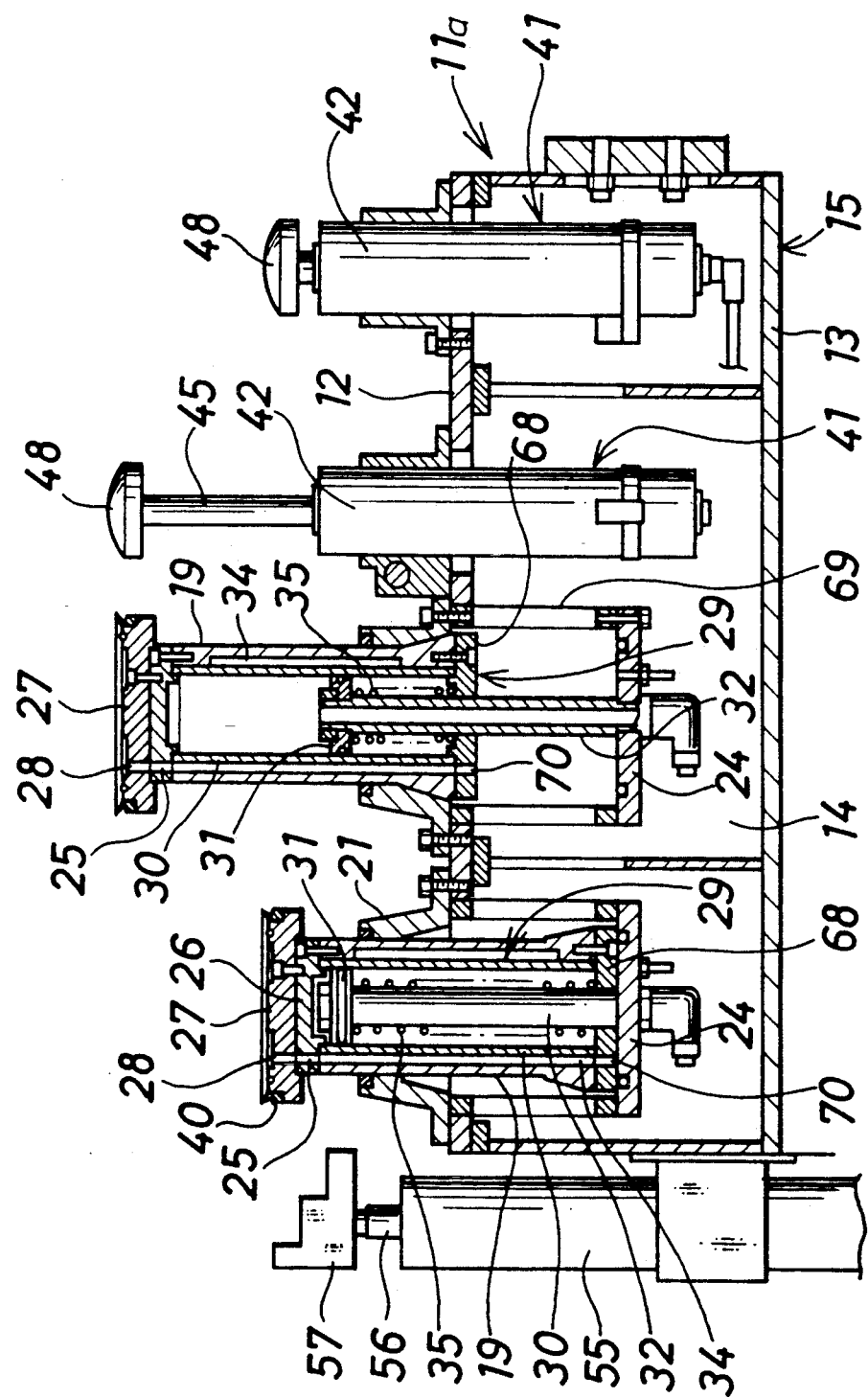
FIG. 4 is an enlarged sectional view of part of another work table to which the present invention is applied.
Figure 5:
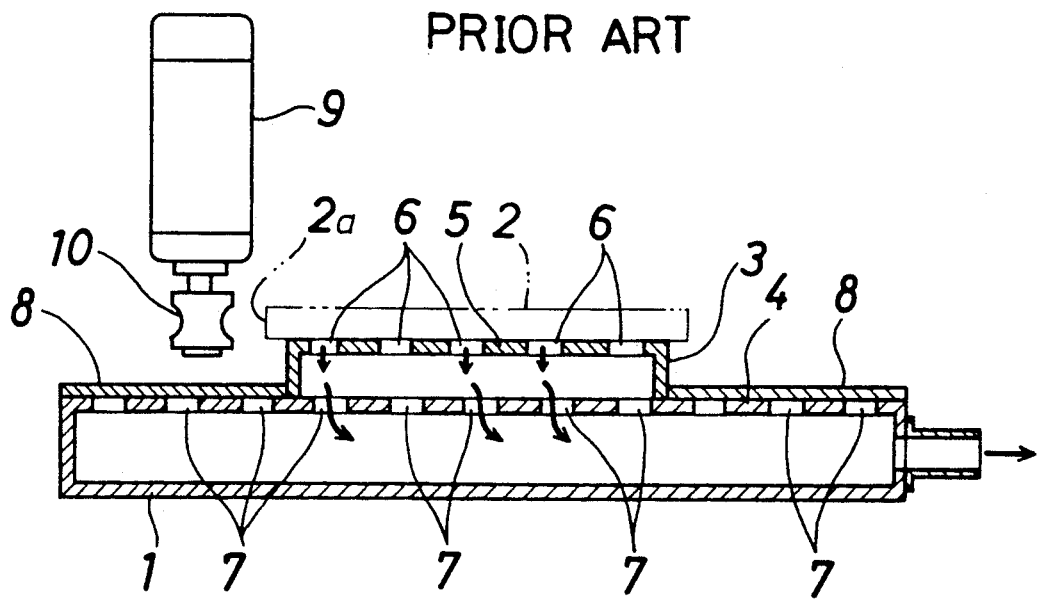
FIG. 5 is a sectional view of a conventional work table.

Referring now to FIG. 4, there is shown another work table to which the present invention is applied. The work table generally denoted at 11a is a modification to the work table 11 described hereinabove but is different from the work table 11 in that the pneumatic cylinder 29 in each of the supporting cylinders 19 is mounted in reverse orientation to that in the work table 11 described hereinabove. In particular, the cylinder tube 30 of each of the pneumatic cylinders 29 is securely mounted in a downwardly directed condition on the corresponding supporting cylinder 19 while the upper end cover 26 and a lower end cover 68 of the supporting cylinder 19 are used commonly as covers for the cylinder tube 30. Meanwhile, the seat plate 24 is mounted horizontally on the lower side of the upper plate 12 of the table body 15 by way of a stay 69. Then, the hollow piston rod 32 of the pneumatic cylinder 29 extends for sliding movement through the lower end cover 68 and has an end secured to the seat plate 24. A return spring 35 is disposed between the piston 31 of the pneumatic cylinder 29 and the lower end cover 68 so that the cylinder tube 30 and the supporting cylinder 19 may normally be urged downwardly by an extending force of the return spring 35 to normally assume a position at which the lower end cover 68 contacts the seat plate 24.

The lower end cover 68 has a hole 70 formed therein in a communicating relationship with the gap spacing 34 between the supporting cylinder 19 and the cylinder tube 30. The hole 70 is closed when the lower end cover 68 contacts with the seat plate 24. Accordingly, in such condition, an attracting air passageway between the air sucking hole 28 of the attracting pad 27 at the top end of the supporting cylinder 19 and the chamber 14 of the table body 15 is in a disconnected condition.

When compressed air is fed into the cylinder tube 30 of each of the supporting cylinders 19 through the corresponding piston rod 32, since the piston rod 32 is fixed to the seat plate 24 and the piston 31 does not move, the cylinder tube 30 and the supporting cylinder 19 are driven to move upwardly in an integral relationship against the return spring 35. Thereupon, the hole 70 of the lower end cover 68 is released from the seat plate 24 to open so that the attracting air passageway interconnecting the air sucking hole 28 of the attracting pad 27 and the chamber 14 is put into a communicating condition.

Meanwhile, in the work table 11a, the balls 47 in the work table 11 described hereinabove are omitted while upper faces of the heads 48 at the top ends of the piston rods 45 of the carrying in/out pneumatic cylinders 41 are formed as spherical faces. On the other hand, where a known pneumatic cylinder with which the operating length of a piston can be adjusted is used for the scale height changing over pneumatic cylinders 55, the vertical positions of the scales 57 can be adjusted stepwise without using such stopper pneumatic cylinders 63 in the work table 11 as described hereinabove.

Having now fully described the invention, it will be apparent to one of ordinary skill in the art that many changes and modifications can be made thereto without departing from the spirit and scope of the invention as set forth herein.

What is claimed is:

1. A work table for a wood working machine or the like, comprising:
    a hollow table body having an upper plate and a lower plate and defining a chamber therein between said upper and lower plates, said chamber being capable of being put into a negative pressure condition;
    a plurality of supporting cylinders mounted for individual upward and downward sliding movement in a juxtaposed relationship on said table body to extend upwardly through and from said upper plate of said table body;
    an attracting pad provided at an upper end of each of said supporting cylinders, each of said supporting cylinders having an air sucking passageway formed therein for communicating said attracting pad with said chamber, said air sucking passageway having a lower end opening at a lower end face of the supporting cylinder;
    a spring for urging each of said plurality of supporting cylinders downwardly to contact the lower end face of each of the supporting cylinders with a seat portion in said chamber to close said lower end opening of said air sucking passageway;
    a pneumatic cylinder disposed in each of said plurality of supporting cylinders for driving each respective supporting cylinder to move upwardly against the corresponding spring; and
    a valve device for controlling supply and discharge of compressed air into and from each of the pneumatic cylinders.

2. A work table for a wood working machine or the like as claimed in claim 1, further comprising a plurality of carrying in/out pneumatic cylinders having piston rods, said plurality of carrying in/out pneumatic cylinders being disposed in a juxtaposed relationship among said plurality of supporting cylinders and capable of lifting, with said piston rods thereof, a workpiece to a position higher than that to which the workpiece is lifted by said plurality of supporting cylinders.

3. A work table for a wood working machine or the like as claimed in claim 2, further comprising a head having a spherical face provided at an upper end of the piston rod of each of said plurality of carrying in/out pneumatic cylinders.

4. A work table as defined by claim 1, wherein each of said pneumatic cylinders disposed in corresponding ones of said supporting cylinders includes a piston rod and a cylinder tube, said spring being positioned within a corresponding supporting cylinder and coupled between said piston rod of said pneumatic cylinder and said cylinder tube to urge said piston rod downwardly.

5. A work table according to claim 1, wherein said attracting pad includes an annular rubber packing mounted thereon.

6. A work table according to claim 2, furhter comprising a return spring coupled to a respective one of said piston rods of said plurality of carrying in/out pneumatic cylinders for urging a respective carrying in/out pneumatic cylinder downwardly.

7. A work table according to claim 1, further comprising at least one scale device mounted on said table body.

8. A work table according to claim 7, wherein said at least one scale device comprises a plurality of scale height changing-over pneumatic cylinders mounted on said table body, and a scale.

9. A work table according to claim 8, wherein said scale includes a pair of upper and lower offset positioning faces formed on an inner side face of said scale, said scale device further comprising a stopper.

10. A work table according to claim 2, further comprising a ball provided at an upper end of a piston rod of each of said plurality of carrying in/out pneumatic cylinders.

* * * * *